United States Patent
Muradov et al.

(10) Patent No.: US 7,455,329 B2
(45) Date of Patent: Nov. 25, 2008

(54) FAST MAKE-UP FATIGUE RESISTANT ROTARY SHOULDERED CONNECTION

(75) Inventors: Andrei Muradov, Houston, TX (US); Raymond Brett Chandler, Spring, TX (US); James W. Breihan, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 447 days.

(21) Appl. No.: 11/164,079

(22) Filed: Nov. 9, 2005

(65) Prior Publication Data
US 2006/0089976 A1    Apr. 27, 2006

Related U.S. Application Data

(63) Continuation-in-part of application No. 10/543,679, filed as application No. PCT/US2004/002540 on Jan. 29, 2004.

(51) Int. Cl.
*F16L 15/00* (2006.01)
*F16L 15/06* (2006.01)

(52) U.S. Cl. .................. 285/333; 285/334; 285/390

(58) Field of Classification Search .......... 285/333, 285/334, 390
See application file for complete search history.

(56) References Cited

U.S. PATENT DOCUMENTS

| | | | | |
|---|---|---|---|---|
| 23,409 | A * | 3/1859 | Thom | 411/411 |
| 1,229,560 | A * | 6/1917 | Whiteman | 411/411 |
| 1,614,815 | A | 1/1927 | Wilson | |
| 2,885,225 | A | 5/1959 | Rollins | |
| 4,161,332 | A * | 7/1979 | Blose | 285/334 |
| 4,192,533 | A * | 3/1980 | Blose | 285/334 |
| 4,431,219 | A * | 2/1984 | Brewer et al. | 285/333 |
| 4,521,042 | A * | 6/1985 | Blackburn et al. | 285/334 |
| 4,549,754 | A | 10/1985 | Saunders et al. | |
| 4,577,895 | A * | 3/1986 | Castille | 285/334 |
| 4,591,195 | A * | 5/1986 | Chelette et al. | 285/332.3 |
| 4,705,307 | A * | 11/1987 | Chelette | 285/332.3 |
| 4,717,183 | A | 1/1988 | Nobileau | |
| 4,728,129 | A * | 3/1988 | Morris | 285/334 |
| 4,865,364 | A * | 9/1989 | Nobileau | 285/334 |
| 4,907,926 | A * | 3/1990 | Wing | 411/366.3 |
| 5,163,523 | A * | 11/1992 | Yousef et al. | 175/320 |
| 5,169,183 | A * | 12/1992 | Hallez | 285/334 |
| 5,492,375 | A * | 2/1996 | Smith | 285/334 |
| 5,908,212 | A * | 6/1999 | Smith et al. | 285/333 |
| 6,030,004 | A * | 2/2000 | Schock et al. | 285/333 |
| 6,120,067 | A | 9/2000 | Mosing et al. | |
| 6,158,785 | A * | 12/2000 | Beaulier et al. | 285/334 |
| 6,290,445 | B1 * | 9/2001 | Duran et al. | 411/423 |
| 6,467,818 | B1 | 10/2002 | Snapp et al. | |
| 6,513,840 | B1 * | 2/2003 | Krug et al. | 285/334 |
| 6,672,813 | B1 * | 1/2004 | Kajita et al. | 411/411 |
| 6,729,658 | B2 * | 5/2004 | Verdillon | 285/333 |
| 6,848,724 | B2 * | 2/2005 | Kessler | 285/334 |
| 2003/0155769 | A1 * | 8/2003 | Haines | 285/333 |
| 2004/0026924 | A1 * | 2/2004 | Kessler | 285/334 |
| 2004/0100098 | A1 | 5/2004 | Church | |
| 2004/0174017 | A1 * | 9/2004 | Brill et al. | 285/333 |
| 2006/0214421 | A1 * | 9/2006 | Muradov | 285/333 |

* cited by examiner

*Primary Examiner*—James M Hewitt
(74) *Attorney, Agent, or Firm*—Jeffery E. Daly

(57) ABSTRACT

A thread form having improved strength and fatigue resistance. The root of the thread may be cut on multiple cutting radii having displaced centers. At least two of the root surfaces formed by cutting radii may have lengths that are greater than the root truncation. The threads may be used in a double start configuration to increase the connection strength and reduce makeup and breakout rotations.

4 Claims, 6 Drawing Sheets

FAST MAKE-UP FATIGUE RESISTANT ROTARY SHOULDERED CONNECTION

CROSS REFERENCE TO RELATED APPLICATION

This application is a continuation-in-part application of PCT/US2004/002540 filed 29 Jan. 2004 and U.S. Ser. No. 10/543,679 filed Jul. 27, 2005.

FIELD OF THE INVENTION

The present invention relates to thread forms and connections formed therewith for securing together components. More specifically, the present invention, in one embodiment, relates to thread forms used to secure together tubular bodies that are assembled to drill and produce wells, and to a multi-start rotary shouldered connection for securing the tubular bodies together.

BACKGROUND OF THE INVENTION

The American Petroleum Institute (API) has standardized various thread forms that are used in the drilling and production of oil and gas wells. One API thread form commonly found in connections used to secure drill pipe together is a modified V-type thread that has a root radius of 0.038 in. The included angle between the stab and load flanks of the thread is 60 degrees and the thread root cutting radius of 0.038 in. is centered on the bisector of the included angle. The API connection provides a root truncation of the straight-V thread form of 0.038 in. where the root truncation is a measure of the distance between the apex of the 60 degree included angle and the thread root.

The performance of the API connection has been improved in the prior art by modifying the thread root configuration. One prior art improvement has been to increase the thread root radius from 0 0.038 in. to 0.042 in. Another prior art improvement has been to enlarge the root by forming different surfaces of revolution along the flank and adjoining root surfaces using different cutting radii centered on the stab flank side of the included angle bisector. This latter thread form is more fully described in U.S. Pat. Nos. 4,549,754 and 6,467,818 incorporated herein in their entirety.

The preferred thread forms described in the '754 patent provide for two different size root cutting radii with the larger of the cutting radii to be substantially larger than the root truncation.

A specific illustrated form of the threads employs one cutting radius of 0.057 in. and another of 0.031 in. within a thread form having a usual root truncation of 0.038 in. as required for mating with an API connection. In the preferred configuration, the smaller radius represents approximately 54 percent of the length of the larger radius.

The '754 patent recognizes that any increase of the root radius over root truncation will result in a decrease in maximum stress and that a substantial increase is preferred to obtain a substantial decrease in maximum stress. The '754 patent proposes as a limit to the root radius increase that the root radius should not be increased to a point that is greater than a distance that would intersect or exceed the pitch diameter. The '754 Patent notes, however, that it is difficult to use this limit of enlarged root diameter in practice since it would tend to produce an under-cut area that would make it difficult to use standard cutting tools. The preferred thread form in the '754 patent was also dictated by a desire to reduce the original thread shear area (base width of the thread form) preferably by not more than 25 percent.

The objectives of the '754 patent were achieved by joining the unloaded thread flank (stab flank) to the thread root by a planar surface with the smaller radius curvature bridging the planar surface and the larger radius root surface.

The thread types of the '754 patent are particularly well-suited to be employed as threaded connectors for use in drilling and producing oil and gas wells. Such connectors are assembled by rotating one of the pipe bodies relative to the other causing the threads to mate and engage with each other to hold the two pipe bodies together. When these connectors are used to assemble a drill pipe and other drilling assemblies, the connections are repeatedly made up and broken out as a part of the process of running the pipe into and out of the well. The speed of assembling and disassembling the connections and the amount of thread wear involved in the process are functions of the number of revolutions of the pipe required to effect full connection and release of the threaded components.

Thread make up speed and thread wear can be reduced by reducing the total amount of thread engagement required for a fully made up connection. The mechanical strength of the connection is, however, also reduced when the total thread engagement is reduced. U.S. Pat. No. 1,614,815 discloses a tubular coupling with double start threads which are mutilated (circumferentially segmented). One of the shoulders is also tapered relative to a plane perpendicular to the connection's central axis. U.S. Pat. No. 2,885,225 discloses a double start pipe coupling without torque shoulders. U.S. Pat. No. 4,717,183 discloses a multi-start threaded connection with a small angle load flank for the threads.

More recently, U.S. Pat. No. 6,120,067 discloses a large diameter threaded tool joint with dual mating shoulders. Publication US 2004/0100098 also discloses a thread design with multi-start threads.

SUMMARY OF THE INVENTION

One embodiment of the thread of the present invention has a thread root area defined by multiple surfaces of revolution. The multiple surfaces have different length cutting radii that are disposed on different centers on the stab flank side of the bisector of the included thread angle. Two of the radii have a length that is greater than the thread root truncation length and the ratio of the smaller to the larger radius length is at least 60 percent. The result is a thread form having greater fatigue resistance and increased strength as compared with prior art designs.

One form of the thread of the present invention provides thread roots having surfaces of revolutions formed with radii having lengths greater than the thread root truncation length with the ratio of the total thread height to the thread truncation length being less than 7. Threads produced with this combination of design features result in improved fatigue resistance and increased strength.

One example of a thread of the present invention provides thread roots having at least one surface of revolution formed with a cutting radius having a length that is greater than the length of a flat transition area on the stab flank joining the curving root area with the major portion of the linear stab flank area.

A specific thread form modified to employ each of these novel features of the present invention exhibited approximately twice the number of cycles to failure as compared with the unmodified thread form.

In one embodiment, a thread of the present invention is used as the thread form in the pin and/or box of a double start threaded connector. The double start connector thread is formed by providing two helically developed thread teeth of the present invention side-by-side on each of the pin and/or the box components of the connector. The two thread teeth are axially separated on the connector component with independent starting and runout points that start at the same axial position, shifted by 180 degrees from each other. The thread teeth of one component of the connector are designed to engage in the recess formed between adjacent helical turns of the two helically extending thread teeth formed on the mating component of the connector.

The double start design permits the pin and box components of the connector to be threadedly engaged and disengaged with each other with only half the number of revolutions relative to each other as is required for engaging and disengaging a connector having a single start thread. The reduction in the revolutions required to make up a double start thread design is beneficial in reducing wear experienced by the connector. The reduced number of turns required to make up or break out the connection also reduces the time required to assemble and disassemble strings of pipe being used in the drilling and completion of wells. These features are especially advantageous when applied to connectors that must be frequently made up and broken out such as is the case with drill strings and work strings used in the drilling and construction of wells.

In one form of the invention, the taper of the box is greater than the taper of the pin. The pitch lines of the pin and box cross each other and diverge from the crossing point toward the external make up shoulder. The pitch diameter on the box is larger than the pitch diameter on the pin. A preferred form of the invention is used with rotary shouldered connectors having a double start thread and internal and external shouldering points.

In one embodiment, a rotary shouldered oilfield tubular connection is provided with multi-start threads. The connection includes a pin member having two or more external starting threads axially spaced between a pin end shoulder and a pin external shoulder radially outward of the two or more external starting threads, with each of the two or more external starting threads including a plurality of circumferentially continuous revolutions forming a spiral. In this embodiment, the box member has two or more internal starting threads axially spaced between a box end shoulder and a box internal shoulder radially inward of the two or more internal starting threads, and each of the two or more internal starting threads include a plurality of circumferentially continuous revolutions forming a spiral for mating with a respective external starting thread. The axial length, AL, between the pin end shoulder and the pin external shoulder divided by the thread lead, LT, of each of the two or more threads is less than 20. Each of the pin end shoulder, the pin external shoulder, the box end shoulder, and the box internal shoulder are preferably circumferential surfaces having a uniform axial spacing with respect to a central axis of the oilfield tubular connection.

DETAILED DESCRIPTION OF PREFERRED EMBODIMENTS

Figure 1:
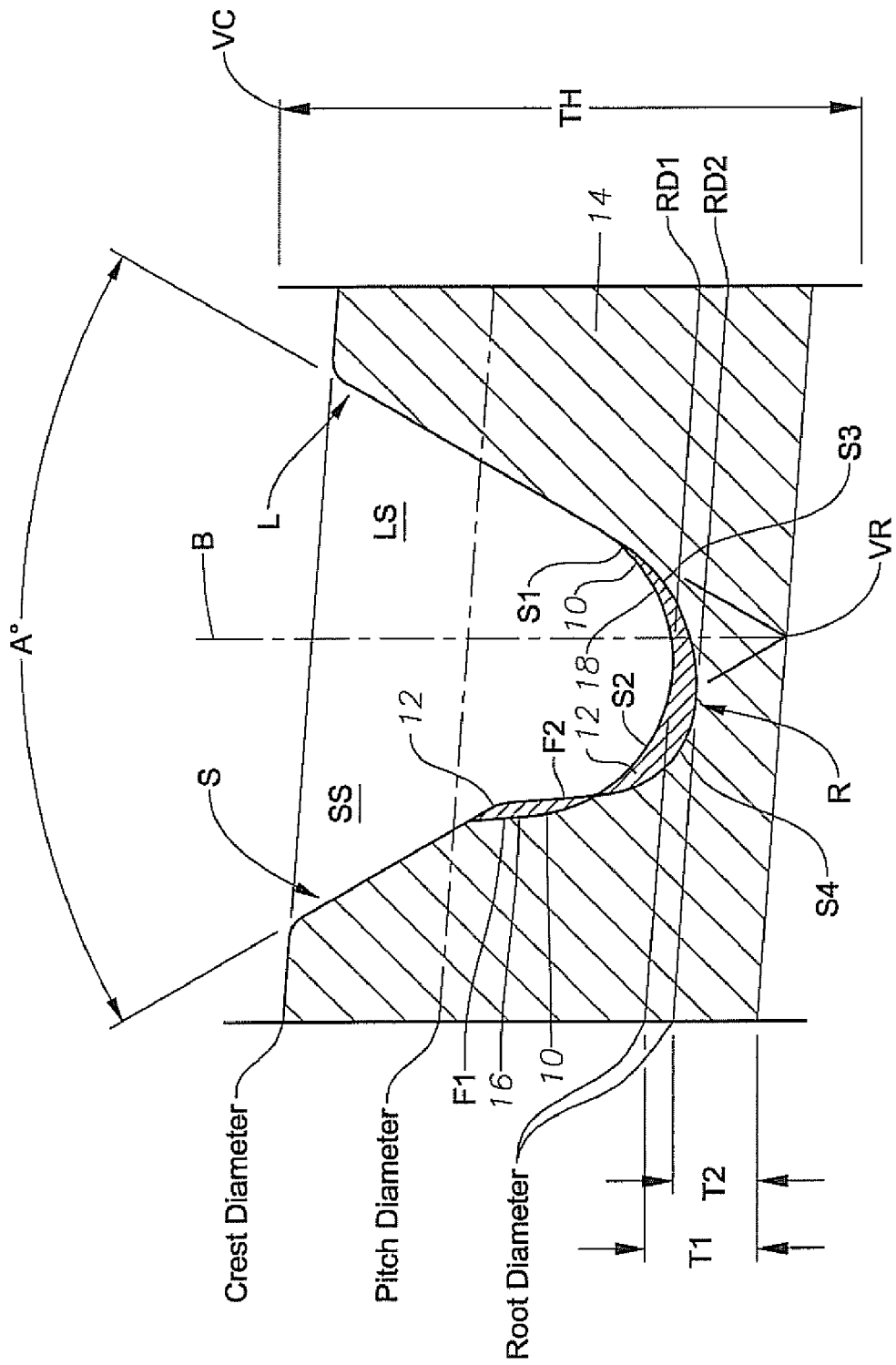
FIG. 1 is an enlarged, partial cross sectional view of a thread form of the present invention overlaying a prior art thread form.
Figure 2:
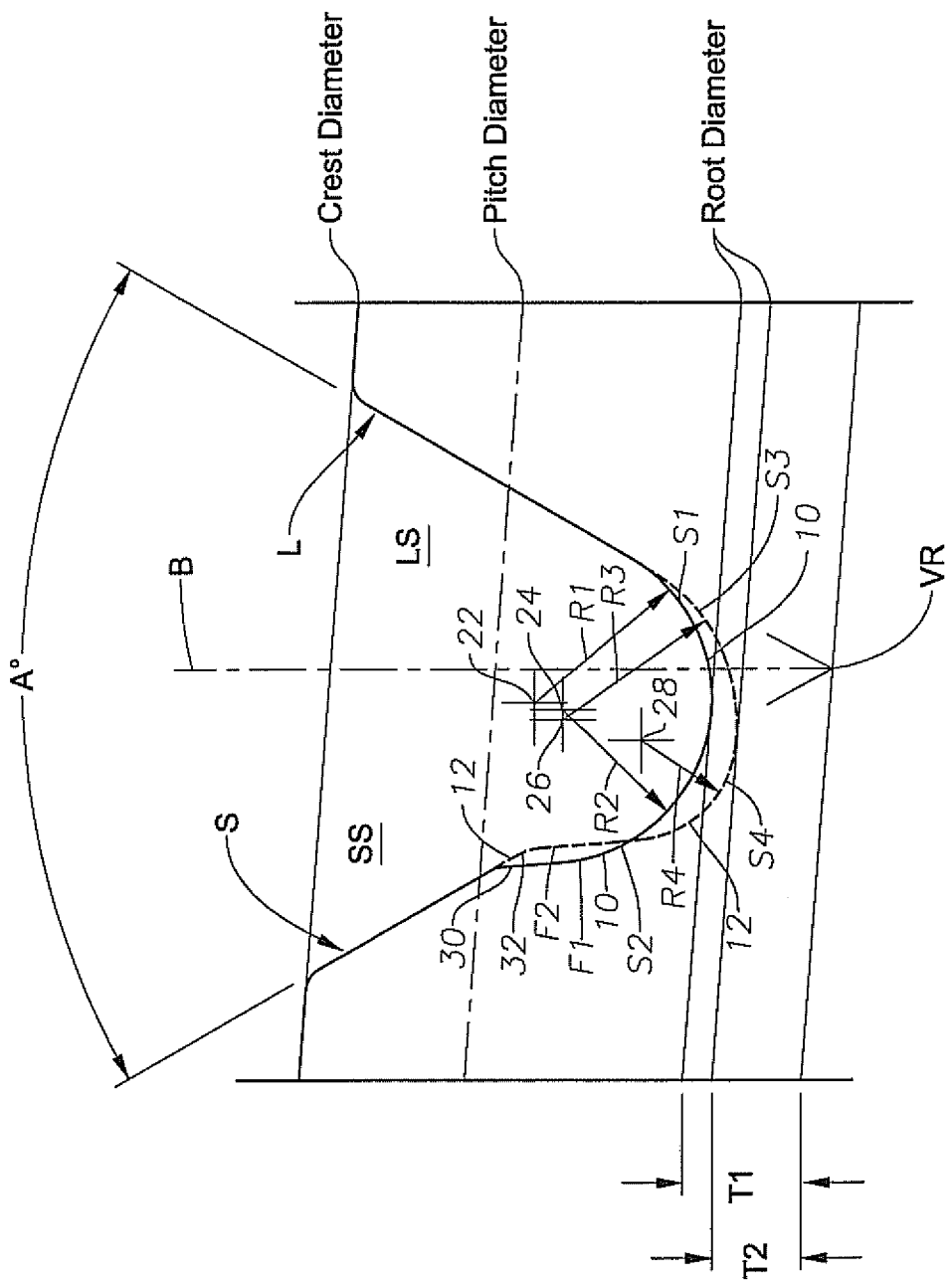
FIG. 2 is an alternate depiction of FIG. 1 illustrating an enlarged, partial cross sectional view of a thread form of the present invention overlying the prior art thread form.

FIGS. 1 and 2 illustrate the profile of one embodiment of a thread form of the present invention, indicated at 10, overlaying a thread form of the prior art, indicated at 12. The threads are shown formed as external threads on a pin body 14. The reference character 10 has been applied to the thread profile of the present invention in each segment isolated by its intersection with the prior art thread form 12. The prior art thread form has been designated with the reference character 12 at each point that it has been isolated by its intersection with the thread form 10 of the present invention. In FIG. 1, the area of the prior art thread form that is removed by the thread form of the present invention is identified by the crosshatched area 16. The area of the thread form of the present invention that is removed by the prior art thread form is identified by the crosshatched area 18. FIG. 2 designates the profile of the prior art thread form with a dashed line and that of the present invention with a solid line.

For purposes of the present description, and with reference to FIGS. 1 and 2, the thread forms will be described with general reference to a stab flank S, a load flank L, a root area R, a root vertex VR and a crest vertex VC. The root vertex and crest vertex are formed by the extension of the major linear stab flank and load flank surfaces. Total thread height is the radial vertex separation indicated by a length TH between the root vertex VR and the crest vertex VC measured along a line perpendicular to the axis of the pipe. The stab flank S and load flank L converge at the root vertex VR to define an included angle A. A line B bisecting the included angle A divides the gap into a stab flank side SS and a load flank side LS. The distance, measured along the bisector line B between the root diameter RD of a thread root and the thread root vertex VR is the root truncation RT.

The stab flank is the face of the thread tooth on one component of the connection that first contacts the mating thread tooth of the second component of the connection when the two separated threaded components are first advanced together for threaded assembly. The load flank is the face of the thread tooth that opposes the stab flank across the thread root gap. The load flank carries the increasing load provided by a tension force attempting to separate the two mated components. Unless otherwise noted, the terms used in this description follow the API convention.

Figure 3:
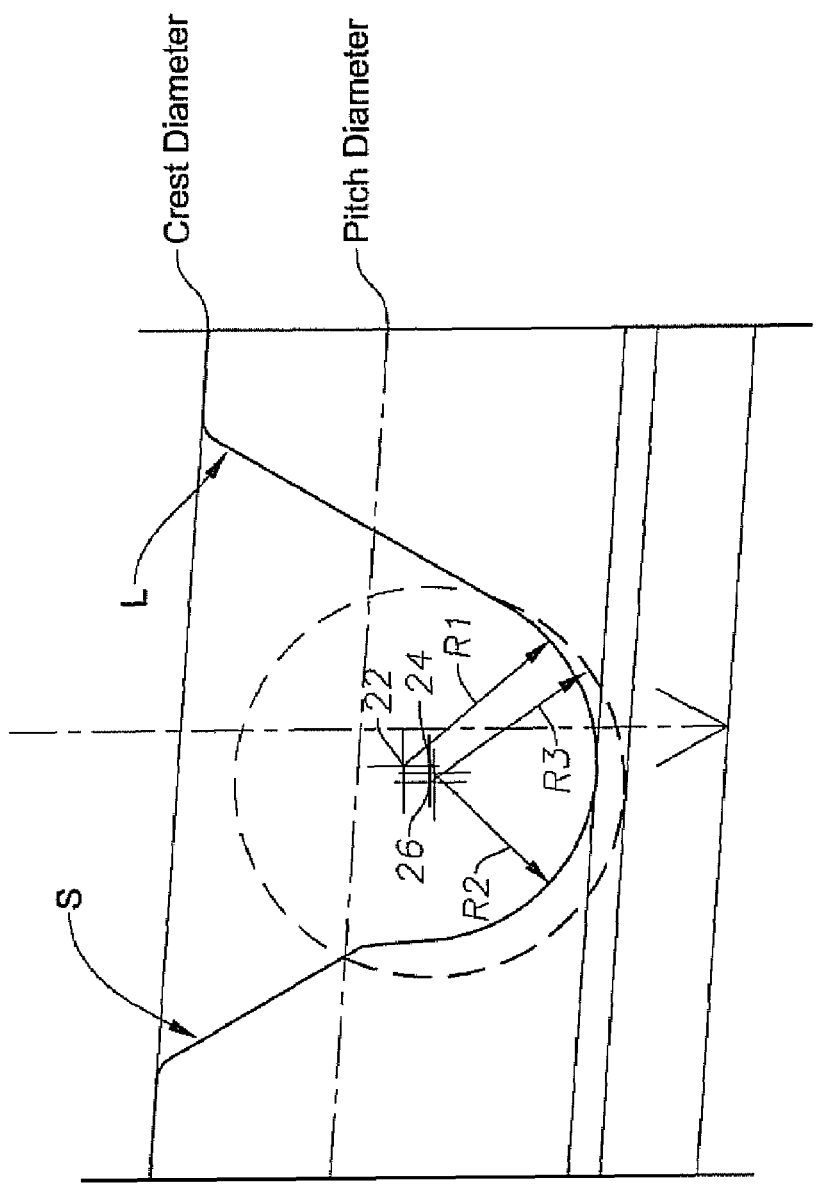
FIG. 3 is an enlarged partial cross sectional view of a thread form of the present invention overlying a variation of the prior art thread form.

Referring to FIGS. 2 and 3, the root of the thread form of the present invention 10 is formed by two surfaces of revolution S1 and S2 defined by cutting radii R1 and R2, respectively, centered on center points 22 and 24, respectively. The cutting radius R1 is a load flank radius and the cutting radius R2 is a stab flank radius. The radii centers 22 and 24 are disposed on the stab flank side of the bisector B of the included angle A defined in the gap between the major stab flank S and the major load flank L. The surface of revolution S2 is joined to the linear portion of the major stab flank S with a linear flat transition section F1 that is tangent to the surface of revolution S2 and makes an angular intersection with the linear portion of the major stab flank S. The linear section of the major load flank L intersects the surface of revolution S1 at a tangent point. The root truncation for the thread form 10 is indicated by the length T1 measured between the root diameter RD1 and the root vertex VR.

The root of the prior art thread form 12 is formed by two surfaces of revolution S3 and S4 that are defined by a load flank cutting radius R3 and a stab flank cutting radius R4. The cutting radii also have radial center points 26 and 28, respectively, on the stab flank side of the bisector B. The prior art thread form 12 includes a linear flat transition section F2 that extends from a tangent point on the surface S4 to the major linear portion of the stab flank S. The surface of revolution S4 connects at a tangent point to the major linear section of the load flank L. The root truncation for the thread form 12 is indicated by the length T2 measured between the root diameter RD2 and the root vertex VR.

The thread form 10 exhibits substantially improved fatigue resistance and strength characteristics over the prior art design 12, in part, because of the amount of curvature within the thread root relative to the linear flat transition sections, the amount of root truncation and the radius of curvature in a critical area of the thread root. In the illustrations of FIGS. 1 and 2, the radii R1 and R2 and the transition flat F1 of the present invention cooperate to form a thread root having a composite configuration that disperses stresses over a larger area than that of the prior art thread form. The transition zone of the thread form 10 from the major root curvature area to the primary stab flank area is increased relative to that of the prior art thread form. The short radius R4 of the prior art thread form produces a sharper curvature that concentrates stresses. The root truncation of the present invention is greater than that of the prior art design. The increase in root truncation improves the connection strength by increasing the amount of metal underlying the root of the last engaged pin thread. Each of these parameters, as disclosed herein, acting both independently and in the described combination produce a thread form exhibiting significantly superior characteristics.

The '754 patent recognizes the benefit of providing a large curving root radius in a thread form. FIG. 3 illustrates the prior art thread form with a thread root cutting radius R3 exhibiting the hypothetical maximum amount of curvature consistent with the teaching of the patent. The use of the hypothetical maximum radius root thread form was not considered practical for the reasons stated in the '754 patent. The inventors of the '754 patent also considered it necessary to smooth the transition from the single large root radius R3 by adding a second substantially smaller radius R4 and a connecting flat transition segment F2.

The thread form of the present invention establishes a relationship between radii length, stab flank flat transition length and root truncation length that overcomes limitations of the prior art and results in a significantly improved connection. Each of the variables, acting alone, contributes to the improved connection. The combination of the features produces a synergism that produces unexpectedly high fatigue resistance and improved strength as compared with an unmodified thread form of the same basic configuration.

In accordance with one embodiment of the present invention, it has been determined that:

The ratio of the total thread height (TH) to the root truncation (T) of one root should be less than 7:

$$TH/T<7.$$

The ratio of the stab flank radius R2 to the load flank radius R1 should be greater than 0.6:

$$R2/R1>0.6.$$

The ratio of the stab flank radius R2 to the tangent flat length F1 should be greater than 1:

$$R2/F1>1.$$

In a preferred form of the present invention, a thread form employing a flat length F1 of 0.0180 in., a-radius R1 of 0.057 in. and a radius R2 of 0.050 in. was employed with a root truncation of 0.042 in. and an included angle of A=60 degrees. The thread form 10 may be advantageously applied to a threaded connection as either the pin or box thread, or both. In another embodiment, the first radial length may be substantially equal to the second radial length.

Figure 4:
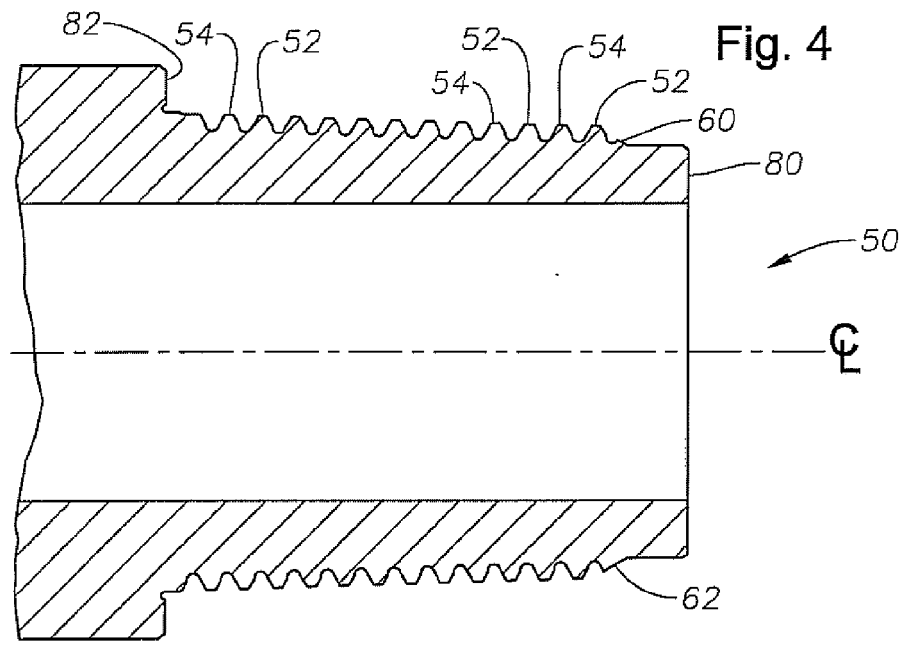
FIG. 4 is a vertical cross sectional view of a rotary shouldered pin equipped with a double start thread form of the present invention.
Figure 5:
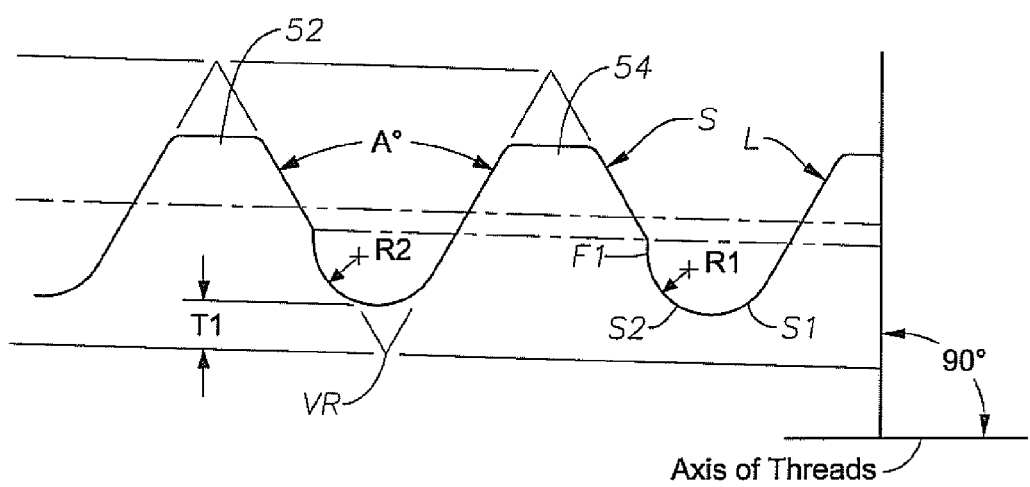
FIG. 5 is an enlarged sectional view illustrating details in the thread configuration of the pin of FIG. 4.

In one embodiment of the present invention, the thread form is applied to the pin and box of a rotary shouldered connection having a double start thread such as illustrated in FIGS. 4-7. The pin of such a connection, indicated generally at 50 in FIG. 4, is provided with two helically developed thread teeth 52 and 54 disposed side-by-side. The two thread teeth 52 and 54 are axially separated on the pin component with independent starting and runout points that start at the same axial position, shifted by 180 degrees from each other. Thus, the thread 52 may be considered to start at the point 60 and the thread 54 may be considered to start at the point 62, which is 180 degrees opposite the point 60.

Figure 6:
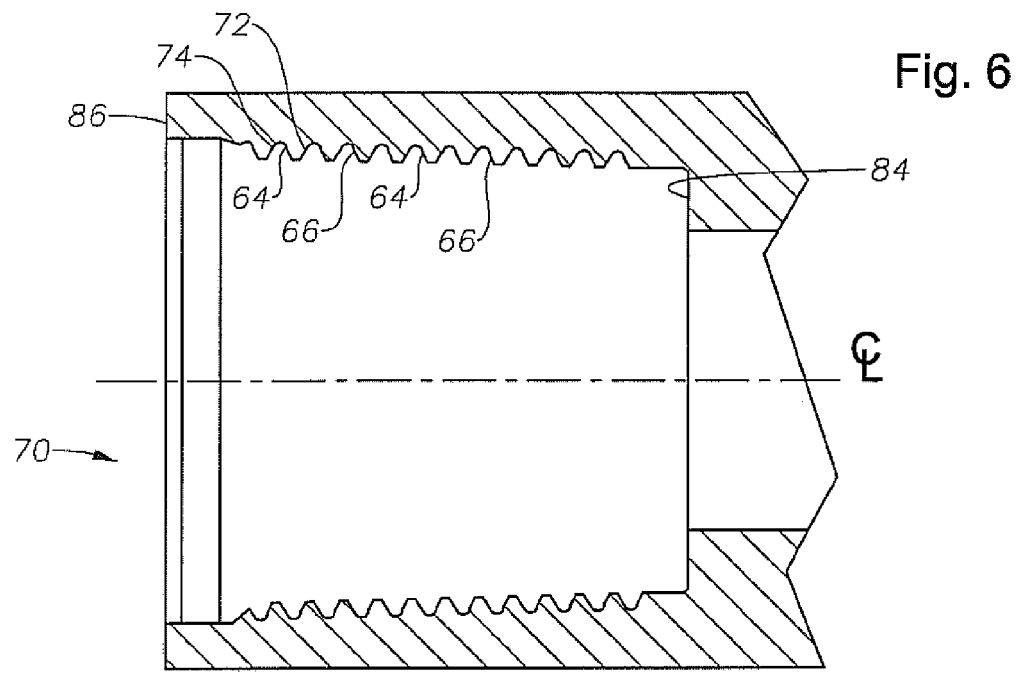
FIG. 6 is a vertical cross sectional view of a rotary shouldered box equipped with a double start thread form of the present invention designed to mate with the pin of FIG. 4.
Figure 7:
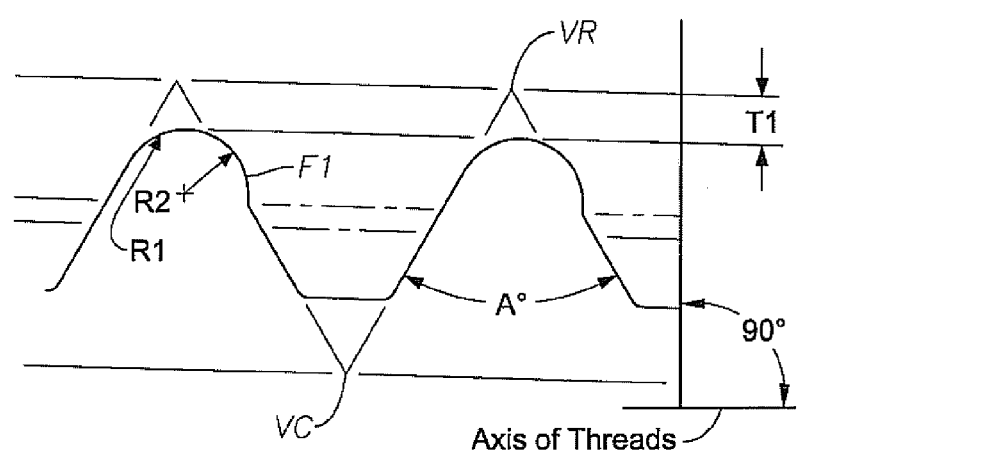
FIG. 7 is an enlarged sectional view illustrating details in the thread configuration of the box of FIG. 6.

The thread teeth 52 and 54 are designed to engage in the recesses 64 and 66, respectively of the box 70 illustrated in FIG. 6. The recesses 64 and 66 are formed between adjacent helical turns of two helically extending thread teeth 72 and 74 formed on the box. The thread forms illustrated in FIGS. 5 and 7 may correspond in shape and relative dimensions to the thread form 10 of the present invention as described with reference to FIGS. 1-3. Corresponding identification indicia are employed in all of the drawings to identify the same or equivalent components.

The pin 50 may be provided with an internal shoulder 80 and an external shoulder 82. The pin shoulders 80 and 82, respectively engage the internal shoulder 84 and the external shoulder 86 of the box 70. At the final make up position of the engaged pin and box connectors, the internal and external shoulders come into abutting engagement.

In a double start thread such as illustrated in FIGS. 4-7, the angle of the helix is greater than that of a single start thread. As a result, there is a reduction in the perpendicular notch affect that is normally present in a single start thread. Since there is a lower normal incident force, there is a reduction in the fatigue generation within thread components during the make up and use of the connection. Thus, by increasing the helix, the resultant stresses acting axially between the pin and box threads are moved off of the perpendicular to reduce the stress exerted in the connection.

A double-start thread is easier to break out than a single start thread. While the initial torque required to break the connection is the same in a double start as in a single start thread, once the connection is broken, the torque required to continue the break out is sharply reduced as compared with that of a single start thread.

In addition to allowing for faster make up and break out speeds, a double start thread increases torsional strength of a tool joint as the P/pi component in a screw jack formula doubles. The double start thread improves fatigue resistance of a tool joint by increasing the helix (or lead) angle at a critical section.

In the preferred form of the present invention, different tapers are provided on the pin and the box to provide a more uniform load distribution in the threads, reducing the stress level at the last engaged thread of the pin, which enhances fatigue life of the connection.

Figure 8:
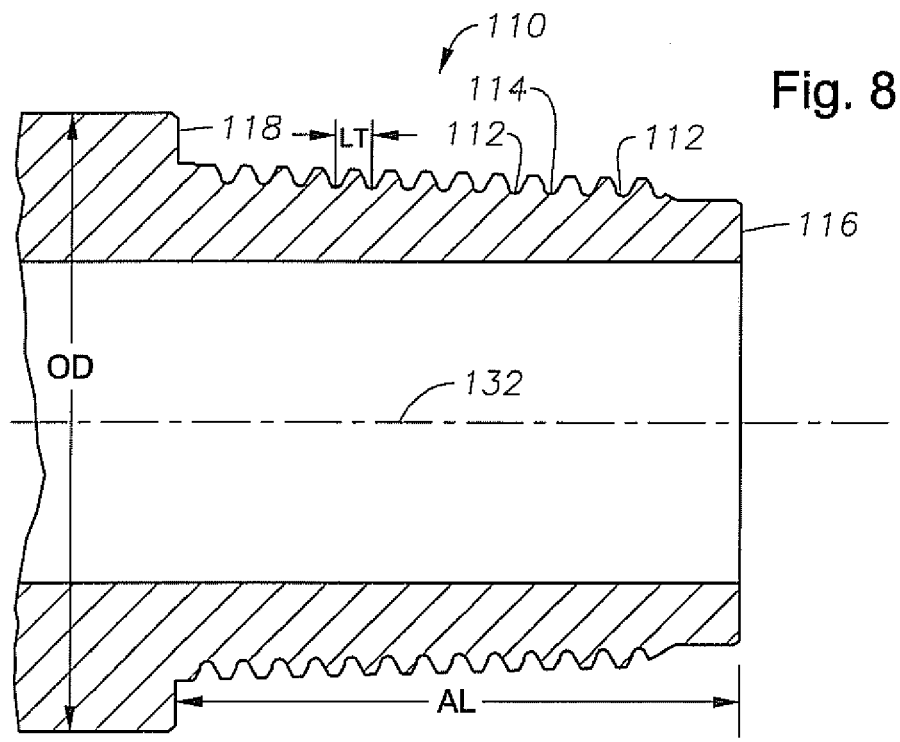
FIG. 8 is a cross-sectional view of a pin member of a rotary shouldered oilfield tubular connection with multi-start threads.
Figure 9:
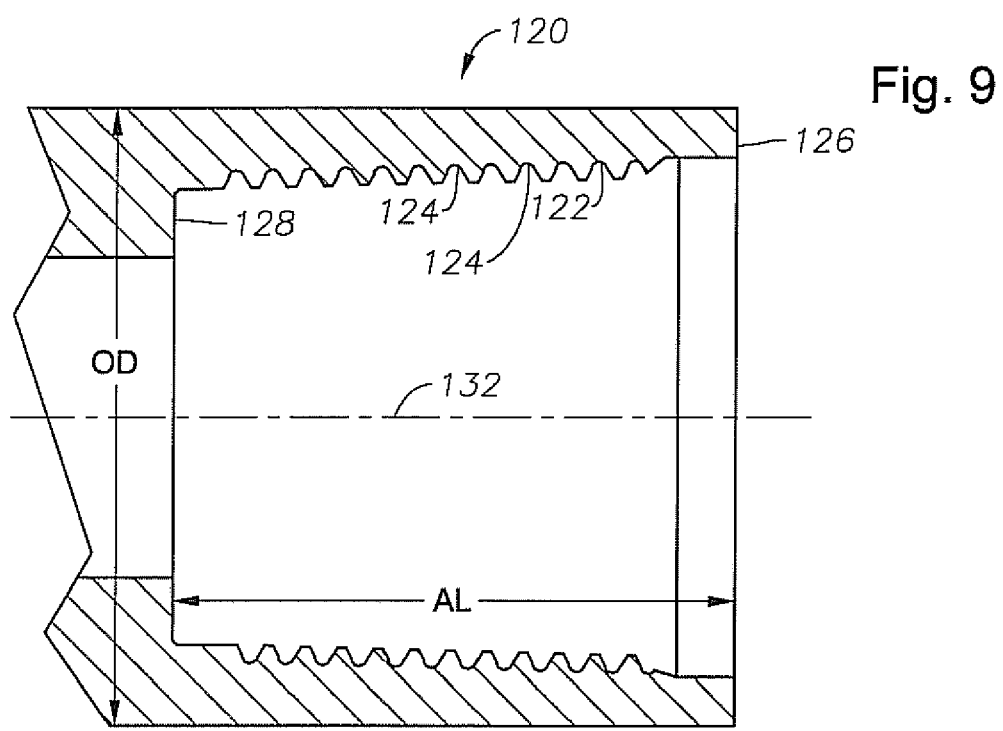
FIG. 9 is an enlarged cross-sectional view of a box member of a rotary shouldered oilfield tubular connection with multi-start threads.

FIG. 8 illustrates a pin member of a rotary shouldered oilfield tubular connection with dual starting threads. Pin member 110 has two external starting threads 112 and 114 each axially spaced between a pin end shoulder 116 and a pin external shoulder 118 radially outward of the two external starting threads. Each of the two external starting threads 112, 114 include a plurality of circumferentially continuous revolutions forming a spiral. FIG. 9 illustrates a mating box member 120 having two internal starting threads 122 and 124 each axially spaced between a box end shoulder 126 and a box internal shoulder 128 radially inward of the two internal starting threads 122, 124. The internal starting threads on the box member also include a plurality of circumferentially continuous revolutions forming a spiral for mating with the respective external starting thread. Each of the threads 112, 114, 122, 124 may be provided along a slight taper, optionally providing a slight difference between the tapers, as discussed above. As shown in FIGS. 8 and 9, the axial spacing between threads 112 and 114 and between 122 and 124 remains substantially constant.

Referring again to FIG. 8, the axial length, AL, between the pin end shoulder 116 and the pin external shoulder 118 is depicted, and this axial length is the same as the axial length between the box end shoulder 126 and the box external shoulder. As a practical matter for this type of connection, the thread length is less than the length, AL, but preferably is in excess of about 70% of the length, AL. In particular embodiments, the axial thread length of the connection is in excess of 75% and frequently in excess of 80% of the length, AL. The thread lead, LT, for the threads on the pin member and the box member are the same, and is equal to the thread pitch times the number of starting threads. Thread pitch, in turn, is 1 divided by the number of threads per inch.

A preferred rotary shouldered oilfield tubular connection is one wherein the length, AL, between the shoulders on both the pin and the box member divided by the thread lead is less than 20, and in many applications is less than 15. The ratio R of the axial length, AL, divided by the thread lead, LT, in most embodiments will be more than 5, and frequently will be about 7 or greater. Moreover, the outer diameter, OD, of the oilfield tubular connection for most applications will be less than about 13 inches, and typically will be less than about 10 inches.

Referring again to FIGS. 8 and 9, each of the pin end shoulder 116, the pin external shoulder 118, the box end shoulder 126, and the box internal shoulder 128 are circumferential surfaces which have a uniform axial position at a fixed radial spacing with respect to a central axis 132 of the pin member and the box member, and thus the central axis of the oilfield tubular connection. In one embodiment, these surfaces may be frustoconical surfaces, with each surface angled at less than about 10 degrees with respect to a plane perpendicular to a central axis of the oilfield tubular connection. For the depicted embodiment, each of these surfaces lie within a plane substantially perpendicular to the central axis of the oilfield tubular connection.

In one embodiment, each of the pin member 110 and the box member 112 are provided on a tool joint configured for welding to a respective elongate tubular member, not shown. The threads and the pin member and the box member may be configured as described earlier, but alternatively could have other configurations. The threads profile preferably has a generally V-shaped configuration, rather than a square thread or hook thread configuration. The connection made by the members shown in FIGS. 8 and 9 has two starting threads, with the starting points for the two threads being spaced circumferentially about 180 degrees apart. In other embodiments, the connection may have 3 or more starting threads to further reduce the number of turns required for make up.

Although the invention has been described in detail with reference to a specific preferred embodiment, from the foregoing description it will readily become apparent to those skilled in the art that many and varied changes can be made without departing from the spirit and scope of the invention.

What is claimed is:

1. A rotary shouldered oilfield tubular connection with multi-start threads, comprising:

a pin member having two or more external starting threads axially spaced between a pin end shoulder and a pin external shoulder radially outward of the two or more external starting threads, each of the two or more external starting threads including a plurality of circumferentially continuous revolutions forming a spiral;

a box member having two or more internal starting threads axially spaced between a box end shoulder and a box internal shoulder radially inward of the two or more internal starting threads, each of the two or more internal starting threads including a plurality of circumferentially continuous revolutions forming a spiral for mating with a respective external starting thread; and at least one of the external starting threads in the pin member including a stab flank, a load flank, a thread root connecting the stab flank and the load flank whereby the stab flank and the load flank define an included angle in a gap bridged by the thread root, a thread root truncation length measured along a bisector of the included angle between the thread root and the apex of the included angle, a first surface of the revolution having a first radial length included in the thread root, a second surface of revolution having a second radial length included in the thread root, centers of revolution for the first and second surfaces of revolutions being disposed on the stab flank side of the bisector of the included angle, and the first radial length and the second radial length each being greater than the thread root truncation length, and the first radial length being at least 60 percent of the second radial length;

the axial length, AL, between the pin end shoulder and the pin external shoulder divided by the thread lead, LT, of the two or more threads being less than 20; and each of the pin end shoulder, the pin external shoulder, the box end shoulder, and the box internal shoulder are circumferential surfaces having a uniform axial position of a fixed radial spacing with respect to a central axis of the oilfield tubular connection.

2. The rotary shouldered oilfield tubular connection as defined in claim 1, wherein the axial length, AL, divided by the thread lead, LT, is less than 15.

3. The rotary shouldered oilfield tubular connection as defined in claim 1, wherein each of the pin member and the box member are provided on a tool joint configured for welding to a respective elongate tubular member.

4. The rotary shouldered oilfield tubular connection as defined in claim 1, wherein the thread form has a ratio of total thread height to root truncation of less than 7.

* * * * *